(12) United States Patent
Harwit

(10) Patent No.: US 7,116,866 B2
(45) Date of Patent: Oct. 3, 2006

(54) BACK-REFLECTION REDUCTION DEVICE

(75) Inventor: Alex Harwit, San Mateo, CA (US)

(73) Assignee: Intel Corporation, Santa Clara, CA (US)

( * ) Notice: Subject to any disclaimer, the term of this patent is extended or adjusted under 35 U.S.C. 154(b) by 88 days.

(21) Appl. No.: 10/353,835

(22) Filed: Jan. 28, 2003

(65) Prior Publication Data
US 2004/0146245 A1 Jul. 29, 2004

(51) Int. Cl.
*G02B 6/32* (2006.01)
(52) U.S. Cl. .......................... 385/38; 385/33
(58) Field of Classification Search ............... 385/38
See application file for complete search history.

(56) References Cited
U.S. PATENT DOCUMENTS

| | | | |
|---|---|---|---|
| 4,783,137 A | 11/1988 | Kosman et al. | 385/33 |
| 6,212,316 B1 | 4/2001 | Presley | 385/31 |
| 6,550,984 B1 * | 4/2003 | Andersen et al. | 385/93 |
| 2002/0085287 A1 * | 7/2002 | Egawa | 359/619 |
| 2002/0097956 A1 | 7/2002 | Kikuchi et al. | 350/96.16 |

* cited by examiner

Primary Examiner—Sung Pak
Assistant Examiner—Tina M. Wong
(74) Attorney, Agent, or Firm—Blakely, Sokoloff, Taylor & Zafman LLP

(57) ABSTRACT

The present invention is directed towards a back-reflection reduction device that is disposed between a support structure containing a plurality of optical waveguides and a bulk media. The support structure containing the optical waveguides has a substantially flat end face at which the optical waveguides terminate. Where the optical waveguides intersect the end face, they are substantially perpendicular to it. The back-reflection reduction device comprises a window disposed between the bulk media and the support structure. The window has a refractive index that is substantially identical to that of the optical waveguides. The window has an inner side that is affixed to the support structure and an opposing outer side. A gap exists between the window outer side and the bulk media. The gap provides an index of refraction substantially equal to unity.

28 Claims, 2 Drawing Sheets

BACK-REFLECTION REDUCTION DEVICE

FIELD OF THE INVENTION

This invention relates to devices and methods for attenuating back reflections in an optical system.

BACKGROUND OF THE INVENTION

Back reflection typically occurs in a fiber optic system when light in an optical system enters or exits a fiber and when light enters or exits a fiber optic component. Typical fiber optic components include fused fiber optic components and micro-optic components.

Examples of fused fiber optic components are fiber optic taps and fiber optic wavelength division multiplexers. In fused fiber optic components the light stays confined to the optical fibers but at least one optical fiber is distorted by one of several processes usually involving heating the fiber while twisting it around another fiber.

Micro-optic components include a variety of very small optical devices in which a microlens substantially collimates the light and free space processing of the light can occur. For instance, in a wavelength division multiplexer, the collimated light interacts with a thin film filter that has been coated to reflect one color of light while transmitting another. In another example, a 1 by 2 switch can be made by directing the collimated light from a microlens into one of two output ports. Complex optical crossconnect switches can be made in a manner similar to the 1 by 2 switch, except that the number of input and output optical fibers can reach 1000 or more.

In the case of micro-optic components, back reflection occurs at every successive interface between regions with different refractive indices and in particular when the light leaves the optical fiber in transit towards the microlens element. More specifically, when light travels from glass to air or air to glass, a reflection occurs at the glass/air interface.

The application of an anti-reflection coating usually can reduce the reflections from about 4% (a typical reflection at an uncoated glass-to-air interface) to about 0.25% over the range of wavelengths used in most optical systems. Typical industry standards for back reflection into an optical fiber call for reflections less than 0.00032% (−55 dB). The intensity of any reflections needs to be very small because reflections back into the optical fiber can destabilize the lasers that are used to generate the light.

In the fiber optics industry, two methods are commonly used to reduce back reflections. One approach involves angle polishing the fiber at approximately eight degrees so that light reflected from the end of the fiber does not get reflected back into the fiber. U.S. Patent Publication 2002/0097956A1 by Kikuchi et al. describes the application of this approach to the interface between optical fibers and the substrate of a microlens array. The second method involves the use of an index-matching fluid or gel at the interface. Since these fluids are index-matched to the fiber, very little light is back reflected when joining two fibers of the same refractive index with a small amount of index-matching fluid or gel. The back reflections in these cases are often of the order of 0.0001% (−60 dB).

In the case of a complex optical crossconnect switch, the optical fibers providing input to the microlens array are typically held in place in a fiber block. Polishing the fiber block at 8-degrees would leave some fibers closer to the microlens array than others. The variable distances to the microlens array inhibits uniformly collimating all the beams of light.

In U.S. Pat. No. 6,212,316 to Presley, a standoff block with a matched refractive index is placed between the optical fiber and the bulk material into which the light is directed. Presley shows the optical fiber to terminate substantially perpendicular to the interface with the standoff block. Although this approach would avoid the problem of having the optical fibers terminate at varying distances from a microlens array, the use of a solid standoff block affixed to both the optical fiber and the bulk media makes fine adjustments during or after assembly difficult, if not impossible.

What is required is a simple device for reducing back reflections that overcomes some of the difficulties encountered with prior art devices.

SUMMARY OF THE INVENTION

The present invention describes a back-reflection reduction device that is disposed between a support structure containing a plurality of optical waveguides and a bulk media. The optical waveguides are designed for transmitting light in a predetermined wavelength range. The support structure containing the optical waveguides has a substantially flat end face at which the optical waveguides terminate. Where the optical waveguides intersect the end face, they are substantially perpendicular to it. This corresponds to a polishing angle of zero degrees, as opposed to the eight-degree polishing angle recommended in Kikuchi et al. The back-reflection reduction device of the present invention comprises a window disposed between the bulk media and the support structure. The window has a refractive index that is substantially identical to that of the optical waveguides in the predetermined wavelength range of the transmitted light. This index-matching of the window and the optical waveguides greatly reduces any back-reflections at their interface. The window has an inner side that is affixed to the support structure and an opposing outer side. As opposed to Presley, a gap exists between the window outer side and the bulk media. The gap provides an index of refraction substantially equal to unity in the predetermined wavelength range of the light transmitted through the optical waveguides.

The present invention should also be construed to include an optical system that includes variations of the back-reflection reduction device described herein.

Additionally, the present invention encompasses a method for reducing back reflections in an optical system. In particular, the method is useful in an optical system that includes a plurality of optical waveguides in a support structure and a microlens array. The microlens array includes a substrate on which are formed (either by deposition or some other fabrication method) lenslets on one side, the opposing side being exposed substrate. The method involves affixing a window to the support structure. The size of a gap between the window and the substrate of the microlens array is adjusted and the optical waveguides are aligned with the lenslets of the microlens array.

Additional features and advantages of the invention will be set forth in part in the description that follows, and in part will be obvious from the description, or may be learned by practice of the invention. Various embodiments of the invention do not necessarily include all of the stated features or achieve all of the stated advantages.

BRIEF DESCRIPTION OF THE DRAWINGS

The accompanying drawings illustrate a complete embodiment of the invention according to the best modes so far devised for the practical application of the principles thereof, and in which.

DETAILED DESCRIPTION OF PREFERRED EMBODIMENTS

Figure 1:
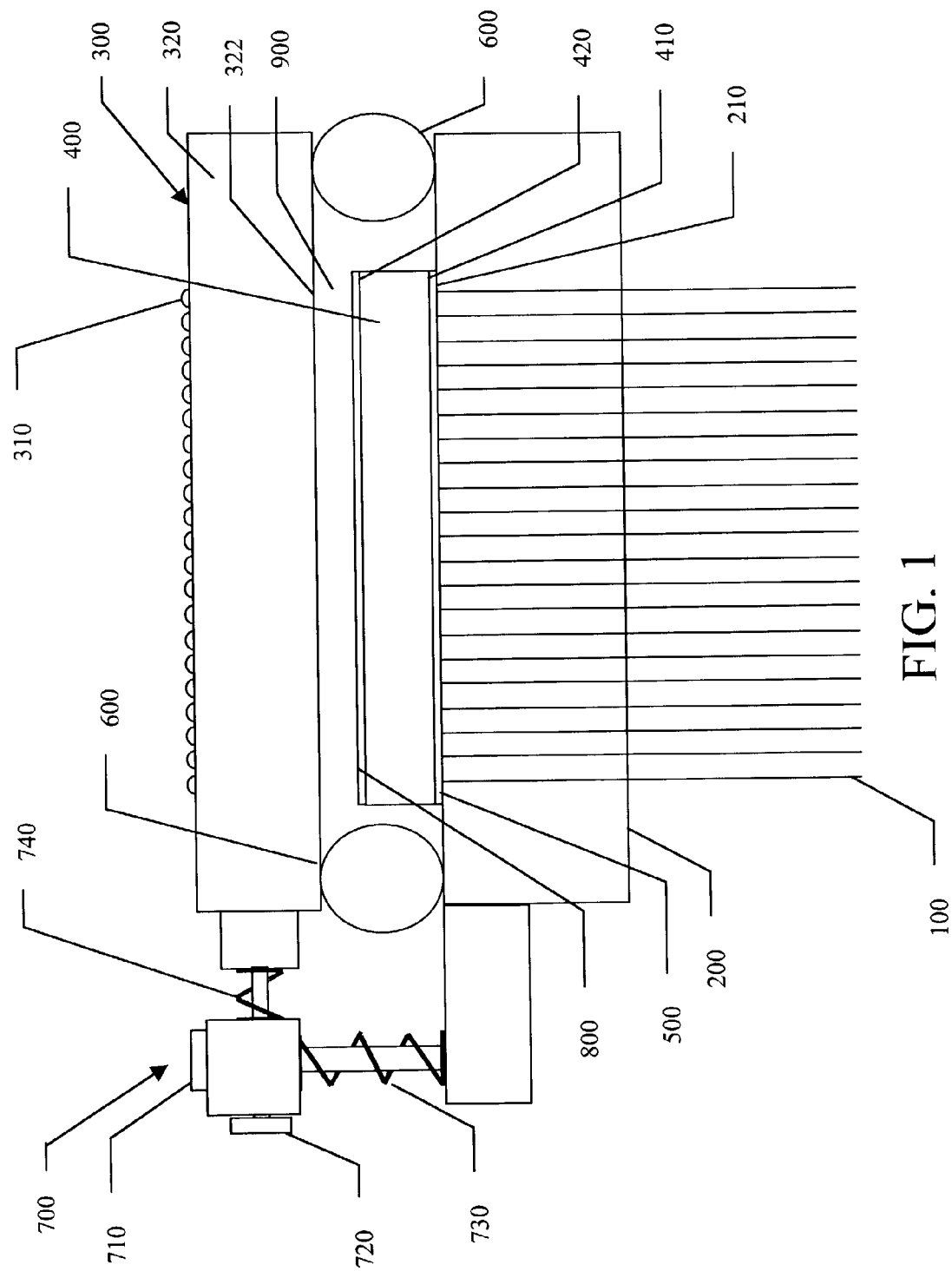
FIG. 1 shows an embodiment of the back-reflection reduction device as employed with a microlens array.

Referring now to the drawings, where similar elements are numbered the same, FIG. 1 depicts an optical system with a back-reflection reduction device. The optical system includes a plurality of optical waveguides for transmitting light in a predetermined wavelength range. In the particular embodiment shown, the optical waveguides are optical fibers 100, but other optical waveguides known to those skilled in the art can be used. To reduce clutter in the figure, only one of the optical fibers 100 is labeled. The optical system further includes a support structure that contains the optical waveguides. Because in the embodiment shown in the figure the optical waveguides are optical fibers 100, the support structure shown is a fiber block 200. The fiber block 200 provides structural support and allows the optical fibers 100 to be arranged in a predetermined pattern. A preferred embodiment of a fiber block is described in U.S. patent application Ser. No. 10/236,471 of Nasiri, Liberkowski, Chen, and Jarfa for an Apparatus for Holding a Fiber Array, filed on Sep. 5, 2002, which is incorporated herein by reference, although other types of fiber blocks could also be used in the present invention. In the embodiment shown in FIG. 1, the fiber block 200 has a substantially flat end face 210 at which the optical fibers 100 terminate. In this embodiment, the optical fibers 100 are substantially perpendicular to the end face 210.

The light transmitted by the optical fibers 100 is directed to a bulk media, which is positioned to receive light exiting the optical fibers. In the embodiment shown in FIG. 1, the bulk media is a microlens array 300 that includes a substrate 320 on which are formed lenslets 310 (only one of which is labeled to reduce clutter) on one side, the opposing side being exposed substrate 322. The lenslets 310 substantially collimate the light after it has passed through the substrate 320. In preferred embodiments, an antireflection coating (not shown) is applied to the lenslets 310 and/or the exposed substrate 322 of the microlens array 300. In general, the bulk media may take many alternative forms, such as a holder for microlenses, another fiber block containing optical fibers for receiving the transmitted light, or some other optical component.

The optical system includes a window 400. The window 400 has an inner side 410 that is affixed to the fiber block 200. For the invention to perform well, the refractive index of the window 400 is substantially identical to that of the optical fibers 100 in the desired wavelength range of the transmitted light. Mismatches in the refractive index of the window 400 and the optical fibers 100 would result in reflections at the interface of the optical fibers 100 and the window 400. To reduce the chance of reflections at the interface, in some preferred embodiments, an index-matching optical adhesive or an index-matching gel 500 is used to secure the window 400 to the fiber block 200. In alternative embodiments, adhesive-free bonding or fusion bonding is used to affix the window 400 to the fiber block 200. An acceptable level of reflection at the interface of the window 400 and the fibers in the fiber block 200 is approximately 0.0001% (−60 dB).

The window 400 also has an outer side 420 opposing the inner side 410. The distance between the inner side 410 and the outer side 420 defines the window thickness. Although the window thickness may vary considerably with different embodiments, in the most preferred embodiments the window thickness is between 1 mm and 8 mm. Although greater window thicknesses result in decreased back reflection intensities, thicker windows require the microlens array to be further from the waveguides, which may result in decreased optical coupling efficiency.

The optical system is further characterized by a gap 900 between the window outer side 420 and the bulk media, which in FIG. 1 is the microlens array 300. The gap 900 has an index of refraction substantially equal to unity in the predetermined wavelength range of the light passing through the gap 900. This is typically achieved by keeping the gap 900 under a vacuum, or near vacuum, or by having the gap 900 filled with a gas. Although the size of the gap 900 will vary with different embodiments, most preferably the gap 900 is between 0.01 mm and 2 mm.

In preferred embodiments, the window outer side 420 includes an antireflection coating 800 that further reduces the back reflections.

In operation, a light beam exits each optical fiber 100 and enters the window 400. If the interface is substantially continuous with respect to refractive index in the wavelength range of interest, minimal reflections will occur because the window 400 has substantially the same refractive index as the optical fiber 100. In preferred embodiments, the use of an index-matched adhesive or an index-matched gel 500 at the interface helps ensure that little, if any reflection occurs. The light beam expands as it traverses the window 400. At the window outer side 420, a reflection occurs. This reflection is weaker if an anti-reflection coating 800 has been applied. The reflected beam further expands as it travels back through the window 400 towards the optical fiber 100. The double expansion of the reflected light beam significantly attenuates its intensity. Although the amount of expansion of the light beam will vary considerably in different embodiments, in some preferred embodiments, when the reflected light beam again reaches the optical fiber 100, it has an effective diameter approximately 100 times greater than the cross-sectional diameter of the core of the optical fiber 100. In such a case, the addition of the window 400 effectively reduces the magnitude of the back reflection coupled into the fiber by approximately $(100)^2=10,000$ or 40 dB. This 40 dB reduction is in addition to the attenuation associated with the reflection at the back surface of the window, itself reduced by any antireflection coating 800 that may have been used. Therefore the back reflected light beam results in a very small back reflection coupling into the optical fiber 100.

The presence of the gap 900 permits adjustments of the optical system during assembly. FIG. 1 includes an alignment mechanism 700 for adjusting the relative position of the fiber block 200 and the microlens array 300. The illustrated alignment mechanism 700 allows for adjustment of the gap 900 by tightening a vertical screw 710 against the bias of a vertical spring 730. Similarly, horizontal adjustment is achieved by tightening a horizontal screw 720 against the bias of a horizontal spring 740. In practice a six-degree-of-freedom alignment mechanism is used to ensure proper alignment of the lenslets of the microlens array with the optical fibers in the fiber block. Such a mechanism allows for translation in three perpendicular directions and tip, tilt, and clocking rotations. Various mechanisms to achieve such capabilities are well known in the art.

In many preferred embodiments of the invention, one or more solid spacers 600 are incorporated to allow permanent attachment of the microlens array substrate 320 to the fiber block 200. The solid spacer 600 is disposed so as to not interfere with the light leaving the optical waveguides (the optical fibers 100 in the embodiment of FIG. 1). In the embodiment illustrated in FIG. 1, the solid spacers 600 are solder joints outside the periphery of the window 400. In this particular embodiment, the solid spacers 600 actually join the fiber block 200 (or in general, the support structure) to the substrate 320 of the microlens array 300 (or in general, the bulk media). In alternate embodiments, the solid spacers 600 may be glass, metal or silicon ridges or pedestals, or any other solid structure, as long as they are located so that they maintain the gap 900, but do not interfere with the light beams leaving the optical waveguides. In some embodiments of the invention, the solid spacers 600 join the window 400 to the bulk media. In other embodiments, the support structure, and the bulk media are secured to a housing. These embodiments facilitate handling of the optical system. In some of these embodiments, the window is also secured to the housing.

Figure 2:
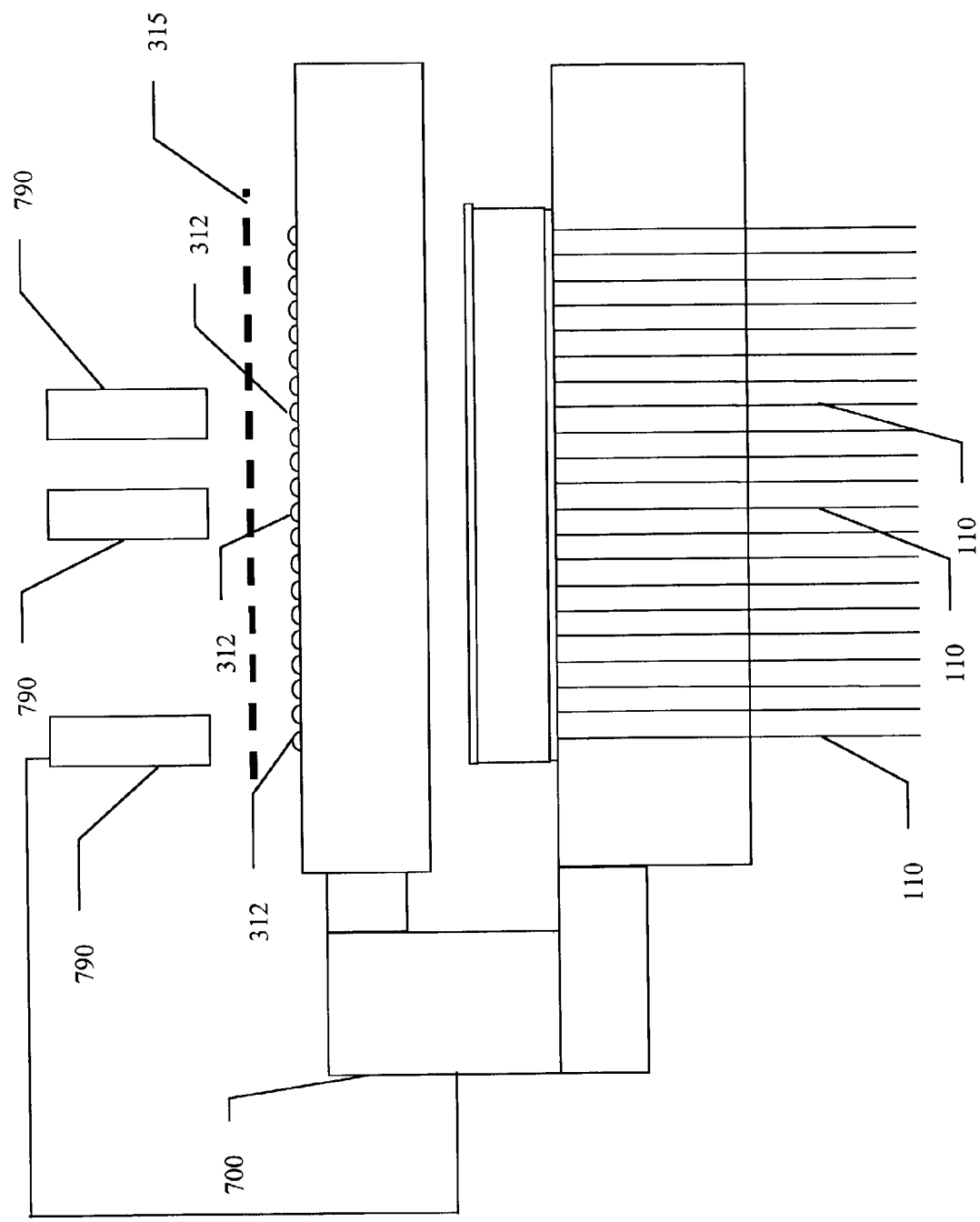
FIG. 2 illustrates an embodiment with fiber-alignment sensors providing error signals to an adjustment mechanism.

An alternative embodiment is shown in FIG. 2. In this figure the alignment mechanism 700 adjusts the alignment in response to error signals generated by one or more alignment sensors 790. In general, this is performed during assembly and locked in place using a solder joint or an adhesive. The adjustment may also be continuous and ongoing, and not just performed during assembly. In FIG. 2, the alignment sensors 790 determine the strength of light beams transmitted from control optical fibers 110. In the embodiment illustrated, the control optical fibers 110 contain light signals of known strength, so variations in the strengths of the signals reaching the alignment sensors 790 through an aperture mask 315 are related to the alignment (or misalignment) of the control optical fibers 110 with respect to the control lenslets 312. The alignment mechanism 700 thereby alters the alignment to maximize the control signal received. Alternate alignment sensors are used in other embodiments of the invention.

The present invention should be understood to be more encompassing than the previously described optical system. The back-reflection reduction device of the present invention comprises a window with an inner side affixed to a support structure. An opposing side of the window is known as the outer side. The window has a refractive index that is substantially identical to that of optical waveguides supported in the support structure. In the back-reflection reduction device of the present invention, a gap exists between the window outer side and a bulk media, which is positioned to receive light exiting the plurality of optical waveguides. The index of refraction of the gap is substantially equal to unity in a predetermined wavelength range of the light passing through the gap. Additional elements and limitations, including, but not limited to those previously described for the optical system should also be considered as part of the invention.

The invention also includes a method for reducing back reflections in an optical system. In a specific example of applying the method, the optical system includes a plurality of optical waveguides in a support structure and a microlens array with lenslets formed on one side and an exposed substrate on an opposing side. To reduce the back reflections, the method involves: affixing a window to the support structure; adjusting the size of a gap between the window and the exposed substrate of the microlens array; and aligning the optical waveguides with the lenslets of the microlens array. In preferred embodiments, the method further comprises the step of forming a solder joint between the exposed substrate of the microlens array and the support structure. The step of forming the solder joint should occur after adjusting the size of the gap and aligning the optical waveguides with the lenslets of the microlens array. In preferred embodiments, the adjusting and aligning are performed in response to changes in error signals obtained from one or more sensors.

The above description and drawings are only illustrative of preferred embodiments, and the present invention is not intended to be limited thereto. Any modification of the present invention that comes within the spirit and scope of the following claims is considered part of the present invention.

What is claimed is:

1. A back-reflection reduction device between a support structure containing a plurality of optical waveguides for transmitting light in a predetermined wavelength range and a bulk media, the support structure having a substantially flat end face at which the optical waveguides terminate, the optical waveguides being substantially perpendicular to the end face, the back-reflection reduction device comprising:
    a window having an inner side and an opposing outer side, the inner side being affixed over substantially its entire area to the flat end face;
    wherein a gap exists between the window outer side and the bulk media, the gap providing an index of refraction substantially equal to unity in the predetermined wavelength range of the light transmitted through the optical waveguides; and
    wherein the window has a refractive index that is substantially identical to that of the optical waveguides in the predetermined wavelength range of the transmitted light.

2. The back-reflection reduction device, according to claim 1, wherein the window is affixed to the support structure with an index-matching gel.

3. The back-reflection reduction device, according to claim 1, wherein the window is affixed to the support structure by an index-matching optical adhesive.

4. The back-reflection reduction device, according to claim 1 further comprising an anti-reflection coating on the outer side of the window.

5. The back-reflection reduction device, according to claim 1, further comprising a solid spacer that maintains the gap between the window and the bulk media, the solid spacer being disposed so as to not interfere with the light leaving the optical waveguides.

6. The back-reflection reduction device, according to claim 1, wherein a distance between the window inner side and the window outer side is between 1 mm and 8 mm.

7. The back-reflection reduction device, according to claim 1, wherein the gap is between 0.01 mm and 2.0 mm.

8. An optical system comprising:
    a plurality of optical waveguides for transmitting light in a predetermined wavelength range;
    a support structure that contains the plurality of optical waveguides, the support structure having a substantially flat end face at which the optical waveguides terminate, the optical waveguides being substantially perpendicular to the end face;

a bulk media positioned to receive light exiting the plurality of optical waveguides;

a window having an inner side and an opposing outer side, the inner side being affixed over substantially its entire area to the flat end face;

wherein a gap exists between the window outer side and the bulk media, the gap providing an index refraction substantially equal to unity in the predetermined wavelength range of the light passing through the gap; and wherein the window has a refractive index that is substantially identical to that of the optical waveguides in the predetermined wavelength range of the transmitted light.

9. The optical system, according to claim 8, wherein the bulk media is a microlens array that includes a substrate on which has been formed lenslets on one side, the opposing side being exposed substrate.

10. The optical system, according to claim 9, further comprising an antireflection coating, the antireflection coating being applied on at least one of the following: the exposed substrate; and the lenslets.

11. The optical system, according to claim 8, wherein the bulk media is a holder in which microlenses have been placed.

12. The optical system, according to claim 8, wherein the optical waveguides are optical fibers and the support structure is a fiber block.

13. The optical system, according to claim 8 further comprising an antireflection coating on the outer side of the window.

14. The optical system, according to claim 8, further comprising a solid spacer that maintains the gap between the window and the bulk media, the solid spacer being disposed so as to not interfere with the light leaving the optical fibers.

15. The optical system, according to claim 8, wherein a distance between the window inner side and the window outer side is between 1 mm and 8 mm.

16. The optical system, according to claim 8, wherein the gap is between 0.01 mm and 2.0 mm.

17. A back-reflection reduction device between a support structure containing a plurality of optical waveguides for transmitting light in a predetermined wavelength range and a bulk media, the support structure having a substantially flat end face at which the optical waveguides terminate, the optical waveguides being substantially perpendicular to the end face, the back-reflection reduction device comprising:

a window having an inner side affixed to the support structure and an opposing outer side, a window thickness being the distance between the window inner side and the window outer side;

wherein a gap exists between the window outer side and the bulk media, the gap providing an index of refraction substantially equal to unity in the predetermined wavelength range of the light transmitted through the optical waveguides;

wherein the window has a refractive index that is substantially identical to that of the optical waveguides in the predetermined wavelength range of the transmitted light; and an alignment mechanism for adjusting the relative position of the support structure and the bulk media.

18. The back-reflection reduction device, according to claim 17, wherein the alignment mechanism includes six-degree-of-freedom alignment capability.

19. The back-reflection reduction device, according to claim 17, wherein the alignment mechanism adjusts the alignment in response to error signals generated by an alignment sensor.

20. An optical system comprising:

a plurality of optical waveguides for transmitting light in a predetermined wavelength range;

a support structure that contains the plurality of optical waveguides, the support structure having a substantially flat end face at which the optical waveguides terminate, the optical waveguides being substantially perpendicular to the end face;

a bulk media positioned to receive light exiting the plurality of optical waveguides;

a window having an inner side affixed to the support structure and an opposing outer side, a window thickness being the distance between the window inner side and the window outer side;

wherein a gap exists between the window outer side and the bulk media, the gap providing an index refraction substantially equal to unity in the predetermined wavelength range of the light passing through the gap;

wherein the window has a refractive index that is substantially identical to that of the optical waveguides in the predetermined wavelength range of the transmitted light; and an alignment mechanism for adjusting the relative position of the support structure and the bulk media.

21. The optical system, according to claim 20, wherein the alignment mechanism includes six-degree-of-freedom alignment capability.

22. The optical system, according to claim 20, wherein the alignment mechanism adjusts the alignment in response to error signals generated by an alignment sensor.

23. A method for reducing back reflections in an optical system that includes a plurality of optical waveguides in a support structure and a microlens array with lenslets formed on one side and an exposed substrate on an opposing side, the method comprising:

affixing a window to the support structure;

adjusting the size of a gap between the window and the exposed substrate of the microlens array;

aligning the optical waveguides with the lenslets of the microlens array, wherein the aligning is performed in response to changes in error signals obtained from one or more sensors.

24. The method, according to claim 23, further comprising:

after adjusting and aligning, forming a solder joint between the exposed substrate of the microlens array and the support structure.

25. The method, according to claim 23, wherein the adjusting is performed in response to changes in error signals obtained from one or more sensors.

26. A method for reducing back reflections in an optical system that includes a plurality of optical waveguides in a support structure and a microlens array with lenslets formed on one side and an exposed substrate on an opposing side, the method comprising:

affixing a window to the support structure;

adjusting the size of a gap between the window and the exposed substrate of the microlens array, wherein the adjusting is performed in response to changes in error signals obtained from one or more sensors;

aligning the optical waveguides with the lenslets of the microlens array.

27. The method, according to claim 26, further comprising:

after adjusting and aligning, forming a solder joint between the exposed substrate of the microlens array and the support structure.

28. The method, according to claim 26, wherein the aligning is performed in response to changes in error signals obtained from one or more sensors.

* * * * *